United States Patent
Barupati et al.

(10) Patent No.: US 9,762,136 B2
(45) Date of Patent: Sep. 12, 2017

(54) THYRISTOR BASED VOLTAGE SOURCE CONVERTER

(71) Applicant: ABB Technology Ltd, Zürich (CH)

(72) Inventors: Praveen Kumar Barupati, Warangal (IN); Tomas Jonsson, Västerås (SE); Sasitharan Subramanian, Ludvika (SE)

(73) Assignee: ABB SCHWEIZ AG, Baden (CH)

(*) Notice: Subject to any disclaimer, the term of this patent is extended or adjusted under 35 U.S.C. 154(b) by 0 days.

(21) Appl. No.: 14/434,646

(22) PCT Filed: Nov. 27, 2012

(86) PCT No.: PCT/EP2012/073714
§ 371 (c)(1),
(2) Date: Apr. 9, 2015

(87) PCT Pub. No.: WO2014/082657
PCT Pub. Date: Jun. 5, 2014

(65) Prior Publication Data
US 2015/0295507 A1    Oct. 15, 2015

(51) Int. Cl.
*H02M 7/487* (2007.01)
*H02M 5/443* (2006.01)
*H02M 7/48* (2007.01)
*H02M 7/483* (2007.01)

(52) U.S. Cl.
CPC ........... *H02M 5/443* (2013.01); *H02M 7/487* (2013.01); *H02M 2007/4811* (2013.01); *H02M 2007/4835* (2013.01)

(58) Field of Classification Search
CPC ......... H02M 2007/4835; H02M 7/487; H02M 7/483; H02M 7/7575; H02M 7/797
See application file for complete search history.

(56) References Cited

U.S. PATENT DOCUMENTS

| | | | |
|---|---|---|---|
| 3,825,813 A | 7/1974 | Wirtz | |
| 4,344,123 A * | 8/1982 | Bhagwat | H02M 7/487 307/107 |
| 4,881,159 A * | 11/1989 | Holtz | H02M 7/487 363/137 |

(Continued)

FOREIGN PATENT DOCUMENTS

| | | | | |
|---|---|---|---|---|
| AU | 45879/72 A | 2/1974 | | |
| GB | 1186363 A * | 4/1970 | | H02M 1/06 |

(Continued)

*Primary Examiner* — Harry Behm
*Assistant Examiner* — Peter Novak
(74) *Attorney, Agent, or Firm* — Birch, Stewart, Kolasch & Birch, LLP

(57) ABSTRACT

A voltage source converter includes a number of valves, the valves including switching elements with anti-parallel diodes provided in a bridge for switching between two states. The bridge is provided in at least one phase leg that stretches between two direct current poles and has at least one midpoint, which is connected to an alternating current terminal. The switching element of at least one valve is a thyristor. The converter further includes a commutation cell associated with the valve, where the commutation cell is controllable to reverse-bias the valve if it is to stop conducting current.

20 Claims, 4 Drawing Sheets

(56) References Cited

U.S. PATENT DOCUMENTS

| | | | | |
|---|---|---|---|---|
| 4,954,726 A | * | 9/1990 | Lipman | H02M 7/529 307/46 |
| 5,621,634 A | * | 4/1997 | Sato | H02M 7/487 363/96 |
| 2004/0052023 A1 | | 3/2004 | Asplund | |
| 2004/0218318 A1 | | 11/2004 | Bijlenga et al. | |
| 2011/0044082 A1 | | 2/2011 | Norrga et al. | |
| 2011/0074489 A1 | * | 3/2011 | Viitanen | H02M 1/08 327/427 |
| 2011/0103115 A1 | | 5/2011 | Jacobson et al. | |
| 2013/0301314 A1 | * | 11/2013 | Fu | H02M 7/487 363/37 |

FOREIGN PATENT DOCUMENTS

| | | |
|---|---|---|
| GB | 1 346 153 A | 2/1974 |
| WO | WO 99/17435 A1 | 4/1999 |
| WO | WO 01/89071 A1 | 11/2001 |
| WO | WO 2010/004190 A1 | 1/2010 |
| WO | WO 2010/081555 A1 | 7/2010 |
| WO | WO 2010/088969 A1 | 8/2010 |
| WO | WO 2011/098117 A1 | 8/2011 |

\* cited by examiner

THYRISTOR BASED VOLTAGE SOURCE CONVERTER

FIELD OF INVENTION

The present invention generally relates to voltage source converters. More particularly the present invention relates to a voltage source converter and a method of controlling the voltage source converter.

BACKGROUND

High Voltage Direct Current (HVDC) converters are mainly classified as Current Source Converters (CSC) and Voltage Source Converters (VSC). CSC converters are based on Line Commutated Converters (LCC) which contains thyristors. Thyristors have some inherent advantages such as being rugged, having low ON state losses, being easy to connect in series with each other, having a short time over-rating capability and having high power rating and being low cost. Moreover, thyristors are well evolved and commonly used components. However, LCC converters have a number of shortcomings: they may experience commutation failure, they require a strong alternating current (AC) grid, they do not support reactive power, have high harmonics, require polarity reversal for power reversal, leave a large footprints, are slow in control and unable to improve AC grid stability.

VSC converters are based on self commutating devices such as Insulated Gate Bipolar Transistors (IGBT), Integrated gate-Commutated Thyristors (IGCT), etc. This type of converters overcomes many shortcomings of LCC.

It has the following features: no commutation failure, it may be connected to a weak AC grid (also passive load), can support reactive power, has low harmonics, does not require polarity reversal for power reversal, is fast in control and able to improve AC grid stability.

However, VSC converters have the following disadvantages: higher ON state loss, higher switching loss, increased rating (due to fault current), frequent failure and higher cost.

Recently VSC employing multiple cells have also been used, where each cell provides a voltage contribution in order to form a waveform that is used to obtain an AC signal.

These converters, which are also termed modular multilevel converters, (M2LC), i.e. multi-cell VSC converters, have some further advantages. They may be provided without filters. Also di/dt and dv/dt problems can be avoided. However they also provide a larger footprint (cell capacitors).

In order to reduce the number of cells various types of director switch solutions have been proposed, where some are described in WO 2011/098117 and WO 2010/088969.

With regard to this it would be of interest to provide an improved voltage source converter, where the advantages of the CSC is obtained.

SUMMARY OF THE INVENTION

The present invention is directed towards obtaining an improved voltage source converter where the advantages of such a converter is combined with the advantages of the thyristor.

This object is according to a first aspect of the present invention achieved through a voltage source converter comprising a number of valves, the valves comprising switching elements with anti-parallel diodes and being provided in a bridge for switching between two states, the bridge being provided in at least one phase leg that stretches between two direct current poles and having at least one midpoint, which is connected to an alternating current terminal: wherein the switching element of at least one valve is a thyristor, and the converter further comprises a commutation cell associated with the valve, wherein said commutation cell is controllable to reverse-bias the valve if it is to stop conducting current.

This object is according to a second aspect of the invention achieved through a method of controlling a voltage source converter comprising a number of valves, the valves comprising switching elements with anti-parallel diodes and being provided in a bridge for switching between two states, the bridge being provided in a phase leg that stretches between two direct current poles and having a midpoint, which is connected to an alternating current terminal where a valve comprises a thyristor as switching element, the method comprising controlling a commutation cell associated with the valve to reverse-bias the valve if it is to stop conducting current.

The present invention has a number of advantages. Since the converter is a voltage source converter it is possible to control both real and reactive power independently of each other. There is furthermore no requirement of any polarity reversal for power reversal, and thereby the converter can be combined with the use of extruded DC cables. The valve cost is also significantly reduced. The invention also allows a substantial loss reduction to be obtained.

BRIEF DESCRIPTION OF THE DRAWINGS

The present invention will in the following be described with reference being made to the accompanying drawings, where FIG. 1 schematically shows a voltage source converter according to a first embodiment of the invention, FIG. 2 schematically shows voltage source converter according to a second embodiment of the invention, FIG. 3 schematically shows an AC voltage generated by the voltage source converter of the first embodiment, FIG. 4 schematically shows a voltage source converter according to a third embodiment of the invention, FIG. 5 schematically shows a voltage source converter according to a fourth embodiment of the invention, and FIG. 6 schematically shows a voltage source converter according to a fifth embodiment of the invention.

DETAILED DESCRIPTION OF THE INVENTION

In the following, a detailed description of preferred embodiments of the invention will be given.

Figure 1:
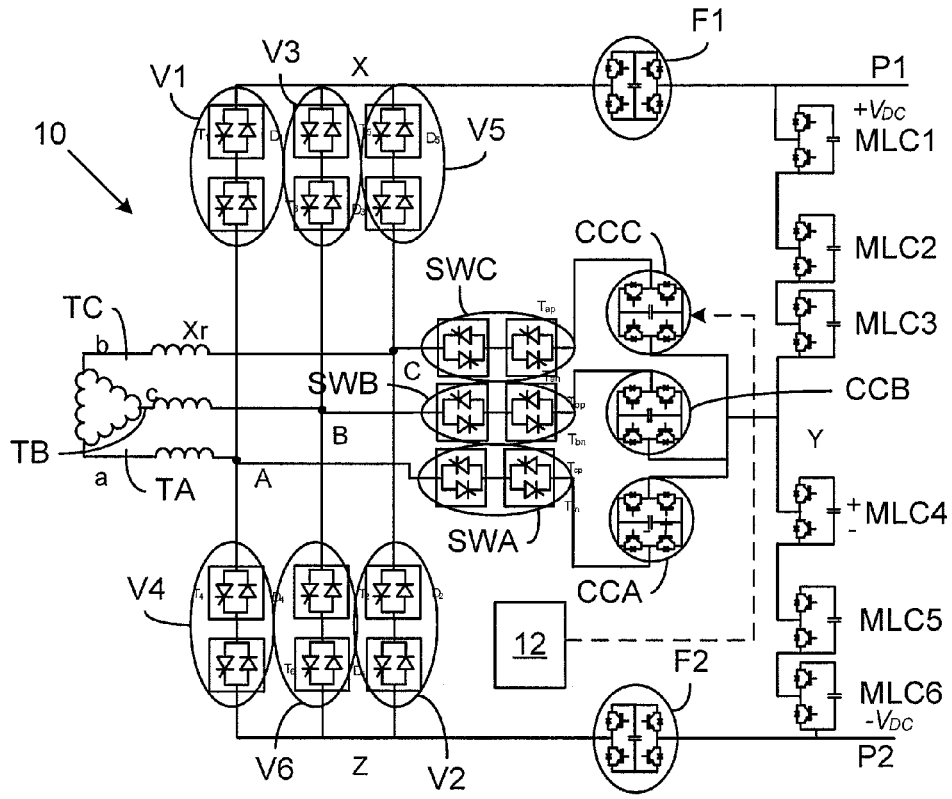

FIG. 1 shows a converter 10 according to a first embodiment of the invention. It comprises a three-phase bridge made up of a number of phase legs. There are in this case three phase legs. There is a first phase leg, a second phase leg and a third phase leg. The phase legs are more particularly connected between a first and a second direct current (DC) pole P1 and P2, where the first pole P1 provides a first voltage $+V_{DC}$ and the second pole P2 provides a second voltage $-V_{DC}$. The mid points of the phase legs are each connected to a corresponding alternating current terminal TA, TB, TC. The midpoints are here connected to an alternating current (AC) terminal TA, TB and TC via a corresponding reactor Xr and the AC terminals are in turn connected to windings of a transformer TR, which windings in this case as an example are delta-connected.

The phase legs are in this first embodiment made up of switching elements with anti-parallel diodes provided in a converter bridge. In the bridge there is a first valve V1 in a first half of a first phase leg and a fourth valve V4 in a second half of the first phase leg, where the midpoint of the first phase leg is connected to the first AC terminal TA forming a first AC phase. The second phase leg comprises as third valve V3 in a first half and a sixth valve V6 in a second half, where the midpoint of the second phase leg is connected to the second AC terminal TB forming a second AC phase. In the bridge there is a finally a fifth valve V5 in a first half of the third phase leg and a second valve V2 in a second half of the third phase leg, where the midpoint of the third phase leg is connected to the third AC terminal TC forming a third AC phase. The bridge is thus provided in at least one phase leg that stretches between two direct current poles P1, P2 and has at least one midpoint, which is connected to an alternating current terminal.

The valves, which may each be termed director valves, are formed through the use of switching elements with antiparallel diodes. These are provided in pairs. Each switching element is thus provided together with a corresponding anti-parallel diode. As an example each valve comprises one switching element with anti-parallel diode. The first halves of the phase legs are furthermore connected to the first pole P1 via an optional first filter F1, while the second halves of the phase legs are connected to the second DC pole P2 via an optional second filter F2. The phase legs are in this ways connected in parallel between the poles P1 and P2, where the connection to the first pole P1 is a first DC point marked X and the connection to the second pole P2 is a second DC point marked Z. The first halves of the phase legs are all being connected to the first filter F1 and the second halves of the phase legs all being connected to the second filter F2. In this first embodiment there is furthermore a series of converter cells, which are multilevel cells MLCs. These cells together provide multiple voltage levels. In this first embodiment the multilevel cells are half-bridge cells, meaning that they provide either a voltage contribution corresponding to the voltage across an energy storage element of the cell or a zero voltage, which energy storage element may be a capacitor. These cells are thus in this first embodiment cascaded two-level cells (CTL). It should however be realized that the cells may as an alternative also be full-bridge cells.

Multilevel does in this regard mean that the cells together provide multiple levels that are used for forming an AC voltage.

In this first embodiment there is a string of multilevel cells MLC1, MLC2, MLC3, MLC4, MLC5, MLC6 connected between the two poles P1 and P2. The midpoint of the string is connected to the midpoints of each of the phase legs of the bridge via a corresponding intermediate branch. The midpoint is furthermore marked with a Y, which forms a third DC point. There is thus here a first intermediate branch interconnecting the midpoint of the first phase leg with the midpoint of the string of cells, a second intermediate branch interconnecting the midpoint of the second phase leg with the midpoint of the string of cells and a third intermediate branch interconnecting the midpoint of the third phase leg with the midpoint of the string of cells. Each intermediate branch comprises bidirectional switches and a commutation cell. The first intermediate branch therefore comprises a first bidirectional switch SWA and a first commutation cell CCA, the second intermediate branch comprises a second bidirectional switch SWB and a second commutation cell CCB and the third intermediate branch comprises a third bidirectional switch SWC and a third commutation cell CCC.

There is furthermore a control unit 12 controlling the operation of the converter 10. In this figure the control unit 12 is only shown as controlling the first and the third commutation cell CCA and CCC. It should be realized the control unit 12 also controls the second commutation cell CCB as well as in fact also all of the switching elements, bidirectional switches and multilevel cells. However, this control has here been omitted in order to focus on one control aspect of the invention, which is the control of the commutation cells.

The filters are in this example provided in the form of full-bridge cells, which may be provided for filtering such things as harmonics.

Most notably though is that the switching elements of the phase legs are provided as thyristors. Each valve is thus made up of a number of pairs of thyristors with anti-parallel diodes. The direction of conduction of the thyristors in the first halves of the phase legs is furthermore away from the first pole P1, while the direction of conduction of the thyristors in the second halves of the phase legs is towards the second pole P2. Another peculiarity with this first embodiment is that also the bidirectional switches are provided as thyristors and here anti-parallel thyristors. The bidirectional switches are more particularly provided as pairs of anti-parallel thyristors, where each bidirectional switch is as an example provided through two such pairs. These bidirectional switches may as an alternative also be provided through the use of for instance IGBTs.

Figure 3:
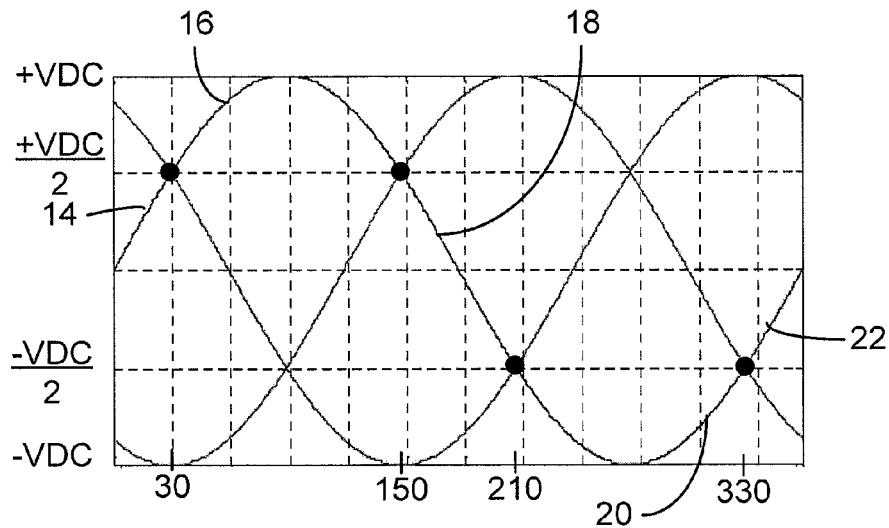

The general operation of the converter can be further exemplified with reference to FIG. 3 which shows one period of the three AC voltages that are provided by the three phase terminals of the converter 10. The general operation will be described for one of the phases, for instance the first phase and the voltage of this phase have a number of sections, a first section 14 between 0 and 30 degrees, a second section 16 between 30 and 150 degrees, a third section 18 between 150 and 210 degrees, a fourth section 20 between 210 and 330 degrees and a fifth section 22 between 330 and 360 degrees. The fifth section 22 will in essence form one section with the first section of a following period.

Starting with the second section 16, the first valve V1 will be conducting, which will place the first AC terminal at a high voltage level. Through the operation of the multilevel cells, this general high voltage will vary. The multilevel cells are more particularly controlled by the control unit 12 so that the voltage varies stepwise from half the positive maximum voltage $+V_{DC}/2$ to the maximum positive voltage $+V_{DC}$ and back to half the maximum voltage $+V_{DC}/2$ between 30 and 150 fifty degrees. Thereafter the first valve V1 stops conducting followed by the first intermediate branch conducting between 150 and 210 degrees for forming the third section 18, where the bidirectional switch of the first intermediate branch will essentially provide a zero voltage, which is varied through the use of the multilevel cells from half the positive maximum voltage $+V_{DC}/2$ to half the maximum negative voltage $-V_{DC}/2$. Thereafter the fourth valve V4 will start conducting, which will place the first AC terminal TA at a low voltage level. Through the operation of the multilevel cells, this general low voltage will vary. The multilevel cells are more particularly controlled so that the voltage varies from half the maximum negative voltage $-V_{DC}/2$ to the maximum negative voltage $-V_{DC}$ and back to half the maximum negative voltage $+V_{DC}/2$ between 210 and 330 degrees for forming the fourth section 20. Thereafter the fourth valve V4 is turned off, which is again followed by the first intermediate branch starting to conduct, which it does between 330 degrees of the first period to 30 degrees of a following period for providing the fifth section 22 and a first section of a following period. The bidirectional switches then essential provide a zero voltage, which is varied using the multilevel cells, from half the negative maximum voltage $-V_{DC}/2$, via a zero voltage to half the maximum positive voltage $+V_{DC}/2$, for providing the voltage of the fifth section 22. As can be understood from what has been described above this operation is also valid for the first section 14 of the first period. It can furthermore be seen that the bridge of valves switches, for each phase, between two different states and the intermediate branch provided an intermediate state, while the string of cells provide voltage variations in relation to each state for forming an AC waveform.

The same type of operation is provided for the other phases in order to obtain the three-phase voltages shown in FIG. 3. This means that when the first valve V1 stops to conducts at 150 degrees, then the third valve V3 of the second branch conducts between 150 and 270 degrees, followed by the fifth valve V5 conducting between 270 degrees and thirty degrees of the following period. In the same manner, the conduction of the fourth valve V4 is preceded by the conduction of the second valve V2 between 90 and 210 degrees and followed by the conduction of the sixth valve between 330 degrees and the 90 degrees of the following period.

As may thus be seen each phase (ABC) is connected at each DC point (XYZ) for a duration of 120° as is indicated above. At any instant, three-phases are connected to one of the three DC points (XYZ) and the three-phase bridge is operated as 120 mode of operation. When two phase voltages are equal, the phase points are swapped between the DC points. The multi-level cells are operated as per the sine wave form of the each phase. The upper and lower halves of the phase legs are complementarily operated and thereby it is possible to obtain a three phase voltage with a limited number of switchings.

Above was described the general operation of a converter of the type shown in FIG. 1. However the valves and bi-directional switches comprise thyristors. As is well known a thyristor is easily turned on.

However, it cannot be turned off unless it receives a negative voltage. The commutation cells are provided for this purpose, namely to provide a negative voltage across the thyristors and thereby to switch them off. In this way it is then possible to have a thyristor operate as an ordinary switching element, such as an Insulated Gate Bipolar Transistor (IGBT), and thereby to operate the converter as a voltage source converter.

As can be seen from the description made above, the thyristor based VSC of the first embodiment is basically a hybrid multi-cell converter, comprising CTL cells and thyristors. It comprises a three-phase bridge based on thyristors, a string of series connected CTLs and intermediate branches of bi-directional thyristors connecting the mid-points of the three-phase bridge with the midpoint of the string of cascaded CTL cells. A commutation cell is in this first embodiment added for each phase in the intermediate branches, to commutate the thyristors. The full bridge cell can be used as commutation cell since it provides three-level voltages. During phase cross-over, the commutation cell offers a negative phase across the thyristors and it provides a small negative current for thyristor commutation.

The valves and the bi-directional switches operate at the fundamental frequency. Thyristors are used as switching device for the valves and bi-directional switches in order to benefit from the advantages of this type of component. To commutate the thyristors, commutation cells are used. To commutate a valve comprising a thyristor, a commutation cell reverse-biases the valve. A commutation cell is thereby associated with at least one valve and controllable to reverse-bias the thyristor of this valve through providing a negative voltage across it if it is to stop conducting current. A negative voltage is here a voltage providing a current having a direction that is the opposite of the current conducting direction of the thyristor.

In some cases to be described below a commutation cell may also reverse-bias the diode of a valve through applying a negative voltage across the anti-parallel diode of this diode is to stop conducting current. A negative voltage is in analogous manner a voltage providing a current having a direction that is the opposite of the current conducting direction of the diode. The negative voltage of a thyristor is furthermore typically opposite to the negative voltage of a corresponding anti-parallel diode.

How the commutation cells are operated will now be described in more detail.

As can be understood from the description made above in relation to FIG. 3, the bi-directional switches switch at phase crossovers of the AC voltage, i.e. at 30°, 90°, 150° etc.

When swapping between phases, zero voltage between incoming and outgoing phase is checked (phase crossover). This means that the control unit performs a check that the voltage of the string shared by a conducting valve and a following entity that is to start conducting is zero. This means that when for instance a switching is to be made at 150 degrees from the first valve V1 conducting to the bidirectional switch of the first intermediate branch conducting the following procedure should be followed;

First, the incoming thyristor is turned ON, to make a path for AC current, which in the example above is the thyristors of the bidirectional switch SWA having the same conduction direction in relation to the first AC terminal TA as the first valve V1.

Then using a commutation cell, a small reverse voltage is applied across the outgoing thyristors, which in the example above means that the first commutation cell CCA provides this reverse voltage across the thyristors of the first valve V1. This commutation cell CCA will thereby supply a small reverse current to commutate the thyristors of the first valve V1.

After the reverse current has been provided, a reverse voltage is built up across the thyristors of the first valve V1 and the anti-parallel diodes of this valve become forward biased. Then the commutation cell is bypassed, through being controlled to provide a zero voltage contribution.

The operation with regard to a phase may also be described in the following way. The commutation cells should be connected for commutating thyristors.

In order to provide a current commutation for obtaining that the thyristor of the first valve V1 stops conducting to the thyristors of the bidirectional switch SWA having a direction of conduction towards the phase terminal starting to conduct, the first commutation cell CCA should provide a negative cell voltage contribution. In order to go from the same thyristors of the bidirectional switch SWA stopping to conduct to making the thyristors of the first valve starting to conduct the first commutation cell should provide a positive cell voltage contribution. In order to go from the anti-parallel diodes of the first valve V1 conducting to the thyristors of the bidirectional switch SWA with a direction of conduction away from the phase terminal starting to conduct, the first commutation cell CCA should provide a positive cell voltage contribution. In order to go from the same thyristors of the bidirectional switch SWA conducting to the anti-parallel diodes of the first valve V1 starting to conduct the first commutation cell CCA should provide a negative cell voltage contribution. This means that when for instance going from the thyristor of the first valve V1 stopping to conduct to the thyristors of the bidirectional switch SWA with a direction of conduction towards the phase terminal to start to conduct, the following steps should be run through 1. Check that there is a zero voltage across the upper half of the string of multi-level cells, i.e. the same potential of incoming and outgoing phase at the instant of 30°, 90°, 150°, etc. of the first phase voltage.
2. Connect the commutation cell CCA with a negative voltage contribution across the outgoing thyristors of the first valve V1.
3. Trigger a pulse to the thyristors of the bidirectional switch SWA with a direction of conduction towards the phase terminal.
4. Commutate the thyristors of the first valve V1 by supplying commutating current through using the first commutation cell CCA with an opposite voltage contribution.
5. Commutation from the anti-parallel diode of the first valve to the thyristor of the first valve V1 and vice versa will be done by line current.

A similar operation is performed with regard to the fourth valve V4 and the first interconnecting branch.

The output line to line voltage is given in FIG. 3. Though there is a bi-directional switch, Ldi/dt problem may not arise because of soft swapping the position with the bridge switches. i.e. between any two phases, the midpoint (Y) with top (X) or bottom (Z) is swapped at the same potential.

This invention thus proposes a VSC which comprises thyristors as switching elements. Thereby it combines the advantages of a VSC with the advantages of thyristors.

Since it is a VSC it is possible to controls both real and reactive power independently of each other. A VSC has the further advantage of not requiring any polarity reversal for power reversal, and thereby it can be combined with the use of extruded DC cables. The valve cost is also significantly reduced as may the costs of multilevel cells be. The invention also allows a substantial loss reduction to be obtained. Another advantage is that there is a smaller footprint with ⅓ the amount of cell capacitors as compared with M2LC. The converter also has a fault current carrying capability for a short duration as well as an overload capability. The converter is further scalable to ultra high voltage and power rating. The converter furthermore employs soft switching, why there are no or only limited di/dt and dv/dt effects.

Figure 2:
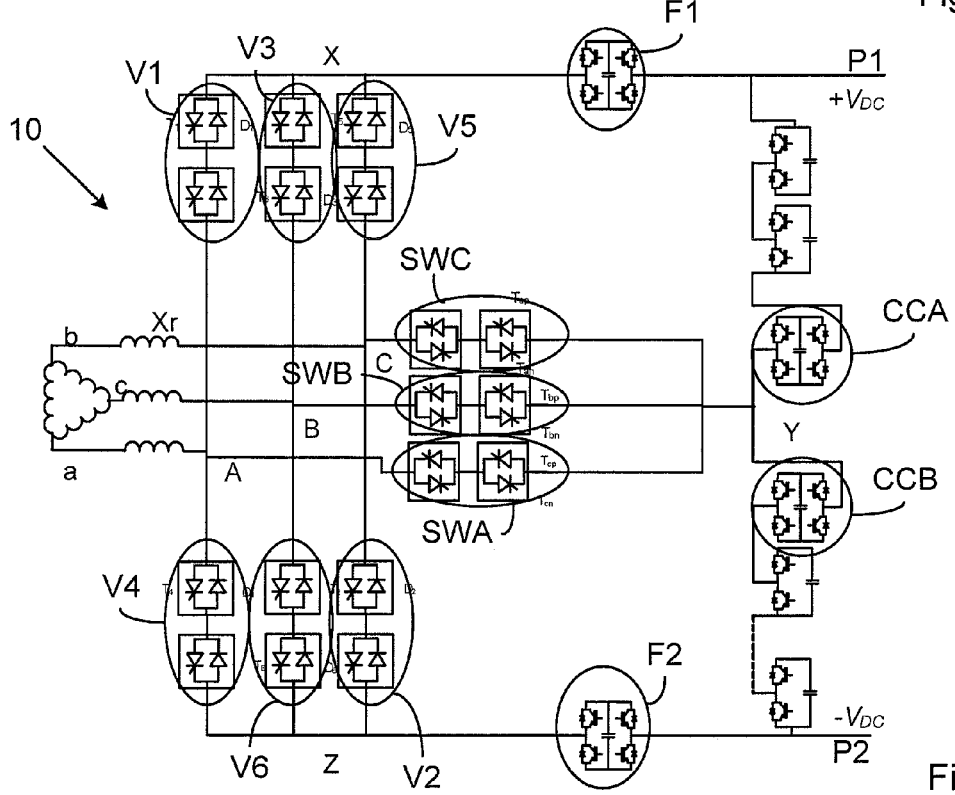

FIG. 2 shows a voltage source converter 10 according to a second embodiment of the invention with the same type of converter structure as in the first embodiment. The difference is here that there are only two commutation cells CCA and CCB. These are furthermore not provided in the intermediate branches, but in the string of multilevel cells MLC1, MLC2, MLC3 and MLC4 on opposite sides of the midpoint Y. They are however operated for performing the same activity.

This has the further advantage of reducing the number of commutation cells.

This embodiment may be further varied through moving the filters F1 and F2. These may be placed on the DC side of the cell string. As the filters are optional they may also be removed completely. Filters are not required.

It is also possible to provide the commutation cells in the phase legs, where there may be at least one commutation cell in each phase leg half. Each phase leg may thus comprise two commutation cells, one on each side of the AC terminal.

Another possible variation is that the control unit uses 3rd harmonic to increase the AC voltage. It may thus add a third harmonic to the fundamental AC frequency in order to raise the efficiency of the conversion.

It is possible to use the principle of commutation cells and director valves also in other cell structures, where bidirectional switches are not used.

Figure 4:
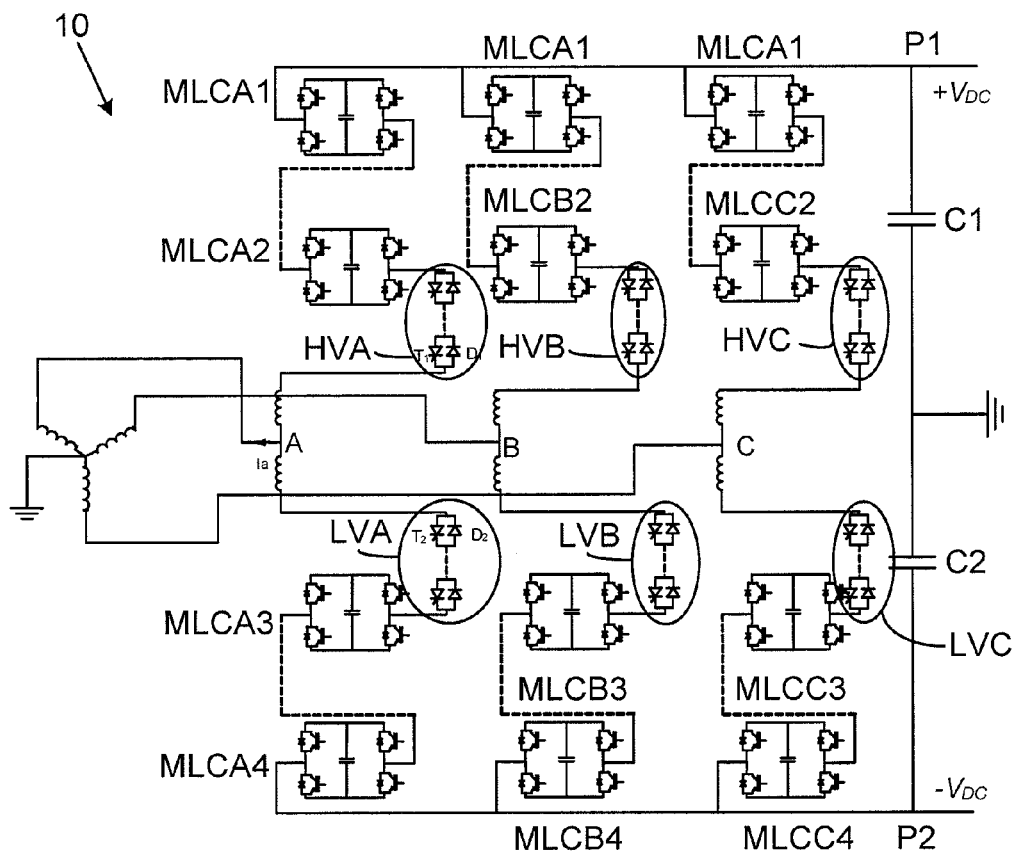

FIG. 4 shows one such structure. Here there is no intermediate branch or separate string of multilevel cells. Instead a pair of capacitors C1 and C2 are connected between the poles P1 and P2, with the midpoint grounded. Each phase leg furthermore comprises a string of multilevel cells MLCA1, MLCA2, MLCA3, MLCA4, MLCB1, MLCB2, MLCB3, MLCB4, MLCC1, MLCC2, MLCC3 and MLCC4, with half of the cells in the first, upper half of the phase leg and the other half of the cells in the second, lower half of the phase leg. These cells are furthermore of the full-bridge type, where one in each half is acting as a commutation cell. The first valve in the first half of the first phase leg is here also termed a high valve HVA, while a second valve of the lower half of the first phase leg is a lower valve LVA.

It can also here be seen that the bridge of valves switches, for each phase, between two different states, while the string of cells provide voltage variations in relation to each state. However, as there is no intermediate branch there is no intermediate state.

The operation of the converter with regard to controlling the valves will now be described in relation to the first phase. The operation of the second and third phases is similar.

The commutation sequence for this type of converter is the following:

If there is positive voltage at the first phase with a positive current, the high valve HVA is ON. When swapping between valves, zero voltage across both the director valves is assured.

Through using an extra cell (commutation cell) in the first and second phase leg half, which extra cell applies a negative voltage across the first valve to commutate the thyristor of the high valve and make the diode of the low valve LVA forward biased. A negative voltage across the high valve HVA is obtained by connecting a commutation cell in positive in the first and second phase leg halves. The switching element of the high valve HVA will then be turned OFF and then the commutation cell is bypassed.

If there is a positive voltage at the first phase with a negative current, the diodes of the high valve HLA are conducting, i.e. ON. When swapping between valves, zero voltage across both the valves is assured.

When a trigger pulse is issued to the thyristor of the lower valve LVA, a reverse voltage is applied to the diodes of the high valve HVA and these are thereby turned OFF. The negative voltage across the diodes is obtained by connecting a commutation cell in negative, i.e. with a negative voltage contribution in the upper and lower phase leg halves.

For commutation from the thyristor of the high valve HVA conducting to the diode of the low valve LVA conducting a commutation cell in both the upper and lower half of the phase leg is controlled to provide a positive voltage contribution.

For commutation from the diode of the low valve LVA conducting to the thyristor of the high valve HVA conducting a commutation cell in both the upper and lower half of the phase leg is controlled to provide a negative voltage contribution.

For commutation from the diode of the high valve HVA conducting to the thyristor of the low valve LVA conducting a commutation cell in both the upper and lower half of the phase leg is controlled to provide a negative voltage contribution.

For commutation from the thyristor of the low valve LVA conducting to the diode of the high valve HVA conducting, a commutation cell in both the upper and lower half of the phase leg is controlled to provide a positive voltage contribution.

Figure 5:
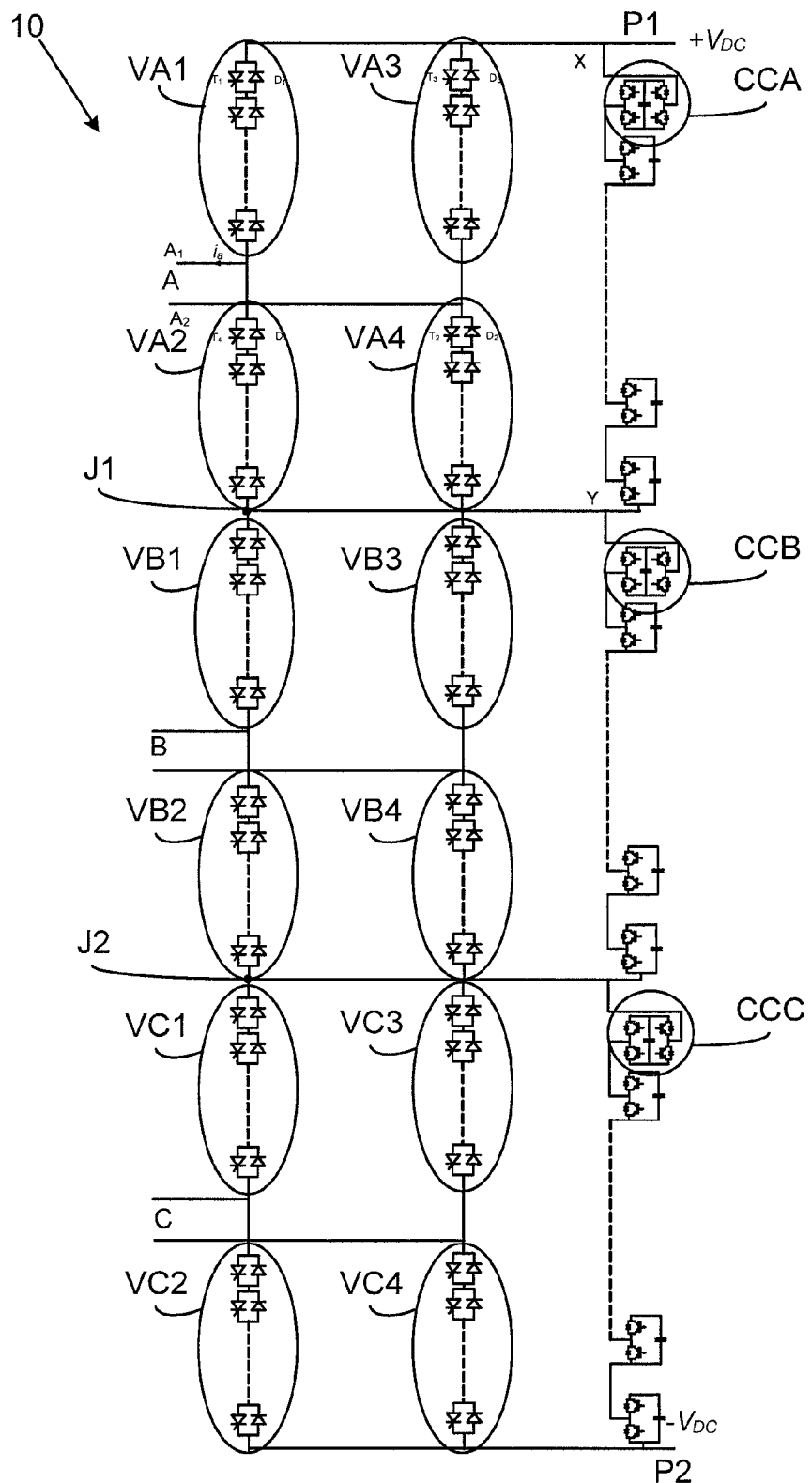

Another type of converter where thyristors may be employed is shown in FIG. 5. In this embodiment there is a bridge for each phase in parallel with a string of multilevel cells. However, in this case the phases are connected in series. There are thus a number of full-bridges connected in series between the two poles P1 and P2.

For a first phase there is therefore a first bridge with a first and a second valve VA1 and VA2 connected in series, each comprising a string of switching elements with anti-parallel diodes, where the midpoint between the first and second valve VA1 and VA2 provides a first AC terminal A1 of the first AC phase. In parallel with the first and second valves VA1 and VA2 there is a series connection of a third and a fourth valve, VA3 and VA4, each comprising a string of switching elements with antiparallel diodes. The midpoint between the third and fourth valve VA3 and VA4 provides a second AC terminal A2 of the first phase. The first and third valve VA1 and VA3 are connected to the first pole P1, while the second and fourth valve VA2 and VA4 are connected to each other at a first junction J1.

For a second phase there is a second bridge with a first and a second valve VB1 and VB2 connected in series with each other, where the midpoint between the first and second valve VB1 and VB2 provides a first AC terminal B1 of the second AC phase. In parallel with the first and second valves VB1 and VB2 there is a series connection of a third and a fourth valve, VB3 and VB4, where the midpoint between the third and fourth valves VB3 and VB4 provides a second AC terminal B2 of the second phase. The first and third valve VB1 and VB3 are connected to the first junction J1, while the second and fourth valves VB2 and VB4 are connected to each other at a second junction J2.

For a third phase there is furthermore a first bridge with a first and a second valve VC1 and VC2 connected in series with each other, where the midpoint between the first and second valve VC1 and VC2 provides a first AC terminal C1 of the third AC phase. In parallel with the first and second valves VC1 and VC2 there is a series connection of a third and a fourth valve VC3 and VC4, where the midpoint between the third and fourth valve VC3 and VC4 provides a second AC terminal C2 of the third phase. The first and third valve VC1 and VC3 are furthermore connected to the second junction J2, while the second and fourth valves VC2 and VC4 are both connected to the second pole P2.

In parallel with these bridges there is furthermore a string of multilevel cells, where a first group in this string is placed in parallel with the bridge of the first phase, a second group is connected in parallel with the bridge of the second phase and a third is connected in parallel with the bridge of the third phase. The first group is furthermore connected between the first pole P1 and the first junction J1, the second group connected between the first and second junctions J1 and J2, while the third group is connected between the second junction J2 and the second pole P2.

In each group of multilevel cells, which are CTL cells, there is provided a commutation cell, i.e. a full-bridge cell. There is thus a first commutation cell CCA in the first group, a second commutation cell CCB in the second group and a third commutation cell CCC in the third group.

The bridges here provide switching between two-levels, while a group of cells provides the AC shape of half a period.

It can also here be seen that the bridge of valves switches, for each phase, between two different states, while the string of cells provide voltage variations in relation to each state.

The commutation sequence for a phase in this type of converter is the following.

If there is a positive voltage across the first phase with a positive current, the first and fourth valves VA1 and VA4 are ON. When swapping between valves, for instance when swapping from VA1 and VA4 being on to VA2 and VA3 being on, zero voltage across the first group of multi-level cells is assured.

Using the commutation cell CCA, a negative voltage is then applied to commutate the thyristors of the first and fourth valves VA1 and VA4 and the diodes of the second and third valves VA2 and VA3 to become forward biased. The switching elements of the first and fourth valves VA1 and VA4 will then be turned OFF. Thereafter the commutation cell is bypassed, i.e. it provides a zero voltage contribution.

If there is a positive voltage across the first phase and a negative current, the diodes of the first and fourth valves V1 and V4 are ON. When swapping between the valves, zero voltage across the first group of multi-level cells is assured.

Thereafter a trigger pulse is issued to the thyristors of the second and third valves VA2 and VA3. A reverse voltage is also applied to the diodes of the first and fourth valves VA1 and VA4 and these are turned OFF.

For current commutation from the thyristors of the first and fourth valves VA1 and VA4 to the diodes of the second and third valves VA2 and VA3, the commutation cell CCA is controlled to provide a negative voltage contribution.

For current commutation from the diodes of the second and third valves VA2 and VA3 to the thyristors of the first and fourth valves VA1 and VA4, the commutation cell CCA is controlled to provide a positive voltage contribution.

For current commutation from the diodes of the first and fourth valves VA1 and VA4 to the thyristors of the second and third valves VA2 and VA3, the commutation cell CCA is controlled to provide a positive voltage contribution.

For current commutation from the thyristors of the second and third valves VA2 and VA3 to the diodes of the first and fourth valves VA1 and VA4, the commutation cell CCA is then controlled to provide a negative voltage contribution.

Figure 6:
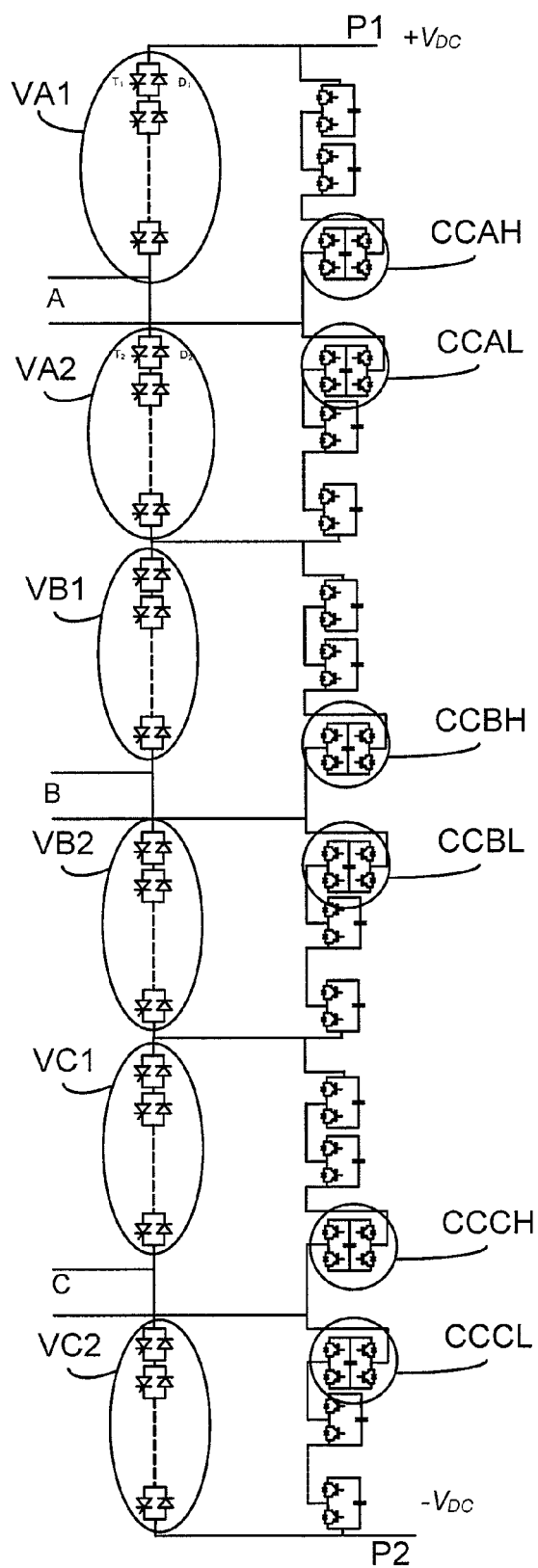

A fifth embodiment of a converter that is a variation of the fourth embodiment is shown in FIG. 6. Here the bridges are half-bridges, there are therefore no third or fourth valves in any of the phases. In order to provide the second AC terminal, the midpoint of a group of cells provides such a second AC terminal of a phase. Furthermore each group comprises two commutation cells CCAH, CCAL, CCBH, CCBL, CCCH and CCCL, one on each side of a second AC terminal.

The commutation sequence for this type of cell will again only be described in relation to the first phase. The sequence used for the other phases will be readily understood form this description. The sequence is the following:

If there is positive voltage at the first phase with a positive current, the thyristor of the first valve VA1 is ON. When swapping between valves, a zero voltage across both the valves is assured.

Using an extra cell CCAH and CCAL (commutation cell) on both sides of the second AC terminal in the first group of multilevel cells, a negative voltage is applied across the first valve VA1 in order to commutate the thyristor of the first valve VA1 and forward bias the diode of the second valve VA2. A negative voltage across the first valve VA1 is obtained by controlling the commutation cells CCAH and CCAL to provide a positive voltage contribution. The first valve VA1 will then be turned OFF and thereafter the commutation cells are bypassed.

If there is a positive voltage at the first phase with a negative current, the diode of the first valve VA1 is ON. When swapping between valves, zero voltage across both the valves is assured.

A trigger pulse is then issued to the thyristor of the second valve VA2. A reverse voltage is applied to the diode of the first valve VA1 and it is turned OFF. A negative voltage across the diode of the first valve VA1 is obtained by connecting the commutation cells CCAH and CCAL on both sides of the second AC terminal in negative, i.e. through controlling these cells to provide a negative voltage contribution.

For current commutation from the thyristor of the first valve VA1 to the diode of the second valve VA2, the commutation cells CCAH and CCAL are both controlled to provide a positive voltage contribution.

For current commutation from the diode of the second valve VA2 to the thyristor of the first valve VA1, the commutation cells CCAH and CCAL are both controlled to provide a negative voltage contribution.

For current commutation from the diode of the first valve VA1 to the thyristor of the second valve VA2, the commutation cells CCAH and CCAL are both controlled to provide a negative voltage contribution.

Finally, for current commutation from the thyristor of the second valve VA2 to the diode of the first valve VA1, the commutation cells CCAH and CCAL are both controlled to provide a positive voltage contribution.

The invention has many advantages. Since it is a VSC it is possible to control both real and reactive power independently of each other. A VSC has the further advantage of not requiring any polarity reversal for power reversal, and thereby it can be combined with the use of extruded DC cables. The valve cost is also significantly reduced as compared with conventional converter valves. The invention also allows a substantial loss reduction to be obtained. The converter also has a fault current carrying capability for a short duration as well as an overload capability. The converter is furthermore scalable to ultra high voltage and power rating. The converter furthermore employs soft switching, why there are no or only limited di/dt and dv/dt effects.

The control unit may be realized in the form of discrete components. However, it may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into a control unit of a voltage source converter.

The commutation cell was above described as being a full-bridge cell. It should however be realized that it may in some instances be a half-bridge cell.

From the foregoing discussion it is evident that the present invention can be varied in a multitude of ways. It shall consequently be realized that the present invention is only to be limited by the following claims.

The invention claimed is:

1. A voltage source converter, comprising:
a number of valves, the valves comprising switching elements with anti-parallel diodes and being provided in a bridge for switching between two states, said bridge being provided in at least one phase leg that stretches between two direct current poles and having at least one midpoint, which is connected to an alternating current terminal, where the switching element of at least one valve is a thyristor;
a commutation cell associated with the valve, wherein said commutation cell is controllable to reverse-bias said valve if it is to stop conducting current; and
at least one string of multilevel cells, said cells being configured to provide voltage contributions to a state of the bridge for assisting in the forming of an AC waveform,
wherein the commutation cell is included in the string of multilevel cells, in a phase leg or in an intermediate branch connected between a midpoint of the phase leg and a midpoint of the string of multilevel cells,
wherein the string of multilevel cells is connected between the two direct current poles,
wherein the intermediate branch comprises a bidirectional switch, and
wherein the commutation cell is controllable to reverse-bias the thyristor of said valve if it is to stop conducting current and the bidirectional switch comprises at least one pair of anti-parallel thyristors, where a thyristor of the bidirectional switch having the same direction of conduction as the thyristor of said valve in relation to the AC terminal is fireable when the thyristor stops to conduct.

2. The voltage source converter according claim 1, further comprising a control unit configured to control the switching of the commutation cell for stopping the valve from conducting current.

3. The voltage source converter according to claim 2, wherein the control unit is further configured to check that the voltage of the string shared by the valve and a following entity that is to start conducting is zero.

4. The voltage source converter according to claim 2, wherein the string of multilevel cells is connected in series to at least one of the valves such that the string of multilevel cells and the at least one of the valves as a whole are connected between the midpoint of the phase leg and one of the two direct current poles.

5. The voltage source converter according to claim 2, wherein the string of multilevel cells is directly connected between the two direct current poles.

6. The voltage source converter according to claim 1, wherein the string of multilevel cells is connected in series to at least one of the valves such that the string of multilevel cells and the at least one of the valves as a whole are directly connected between the midpoint of the phase leg and one of the two direct current poles.

7. The voltage source converter according to claim 1, wherein the string of multilevel cells is directly connected between the two direct current poles.

8. The voltage source converter according to claim 1, wherein the commutation cell is a full-bridge cell.

9. The voltage source converter according to claim 1, wherein the commutation cell is a half-bridge cell.

10. The voltage source converter according to claim 1, wherein each of said multilevel cells is a half-bridge cell having an energy storage element, and is configured to provide either a voltage contribution corresponding to a voltage across the energy storage element or a zero voltage to the state of the bridge for assisting in the forming of the AC waveform.

11. A voltage source converter, comprising:
 a number of valves, the valves comprising switching elements with anti-parallel diodes and being provided in a bridge for switching between two states, said bridge being provided in at least one phase leg that stretches between two direct current poles and having at least one midpoint, which is connected to an alternating current terminal, where the switching element of at least one valve is a thyristor;
 a commutation cell associated with the valve, wherein said commutation cell is controllable to reverse-bias said valve if it is to stop conducting current; and
 at least one string of multilevel cells, said cells being configured to provide voltage contributions to a state of the bridge for assisting in the forming of an AC waveform,
 wherein the commutation cell is included in the string of multilevel cells, in a phase leg or in an intermediate branch connected between a midpoint of the phase leg and a midpoint of the string of multilevel cells,
 wherein the string of multilevel cells is connected between the two direct current poles,
 wherein the intermediate branch comprises a bidirectional switch, and
 wherein the commutation cell is controllable to reverse-bias the anti-parallel diode of said valve, if it is to stop conducting current and the bidirectional switch comprises at least one pair of anti-parallel thyristors, where a thyristor of the bidirectional switch having the same direction of conduction as the diode of said valve in relation to the AC terminal is fireable when the anti-parallel diode stops to conduct.

12. The voltage source converter according claim 11, further comprising a control unit configured to control the switching of the commutation cell for stopping the valve from conducting current.

13. The voltage source converter according to claim 12, wherein the control unit is further configured to check that the voltage of the string shared by the valve and a following entity that is to start conducting is zero.

14. The voltage source converter according to claim 12, wherein the string of multilevel cells is connected in series to at least one of the valves such that the string of multilevel cells and the at least one of the valves as a whole are connected between the midpoint of the phase leg and one of the two direct current poles.

15. The voltage source converter according to claim 12, wherein the string of multilevel cells is directly connected between the two direct current poles.

16. The voltage source converter according to claim 11, wherein the string of multilevel cells is connected in series to at least one of the valves such that the string of multilevel cells and the at least one of the valves as a whole are directly connected between the midpoint of the phase leg and one of the two direct current poles.

17. The voltage source converter according to claim 11, wherein the string of multilevel cells is directly connected between the two direct current poles.

18. The voltage source converter according to claim 11, wherein the commutation cell is a full-bridge cell.

19. The voltage source converter according to claim 11, wherein the commutation cell is a half-bridge cell.

20. The voltage source converter according to claim 11, wherein each of said multilevel cells is a half-bridge cell having an energy storage element, and is configured to provide either a voltage contribution corresponding to a voltage across the energy storage element or a zero voltage to the state of the bridge for assisting in the forming of the AC waveform.

* * * * *